(12) United States Patent
Caillon et al.

(10) Patent No.: US 9,214,673 B2
(45) Date of Patent: Dec. 15, 2015

(54) POSITIVE ELECTRODE MATERIAL FOR A LITHIUM-ION ACCUMULATOR

(75) Inventors: Georges Caillon, Bruges (FR); Stephane Levasseur, Brussels (BE); Thierry Hezeque, Aubie Espessas (FR); Christian Jordy, St Louis De Montferrand (FR); Nina V. Kosova, Novosikbirsk (RU); Evgeniya T. Devyatkina, Novosibirsk (RU)

(73) Assignees: SAFT, Bagnolet (FR); UMICORE, Brussels (BE)

( * ) Notice: Subject to any disclaimer, the term of this patent is extended or adjusted under 35 U.S.C. 154(b) by 603 days.

(21) Appl. No.: 13/414,413

(22) Filed: Mar. 7, 2012

(65) Prior Publication Data

US 2012/0295162 A1 Nov. 22, 2012

(30) Foreign Application Priority Data

Mar. 8, 2011 (FR) ...................... 11 51899

(51) Int. Cl.
*H01M 4/38* (2006.01)
*C01G 23/00* (2006.01)
(Continued)

(52) U.S. Cl.
CPC ............. *H01M 4/38* (2013.01); *C01G 23/003* (2013.01); *C01G 45/12* (2013.01); *C01G 53/44* (2013.01); *H01M 4/131* (2013.01); *H01M 4/133* (2013.01); *H01M 4/134* (2013.01); *H01M 4/1315* (2013.01); *H01M 4/1391* (2013.01); *H01M 4/13915* (2013.01); *H01M 4/485* (2013.01); *H01M 4/505* (2013.01); *H01M 4/521* (2013.01); *H01M 4/525* (2013.01); *H01M 4/587* (2013.01); *H01M 4/625* (2013.01); *H01M 10/0525* (2013.01); *C01P 2002/72* (2013.01);
(Continued)

(58) Field of Classification Search
CPC ....................................................... H01M 4/38
USPC ............... 429/221, 144, 223, 231.1, 211, 217
See application file for complete search history.

(56) References Cited

U.S. PATENT DOCUMENTS 5,674,645 A * 10/1997 Amatucci et al. ............. 429/224
6,458,487 B1 10/2002 Takeuchi et al.
(Continued)

FOREIGN PATENT DOCUMENTS

WO WO 2006/112674 A1 10/2006
WO WO 2011/019218 * 2/2011

*Primary Examiner* — Patrick Ryan
*Assistant Examiner* — Alex Usyatinsky
(74) *Attorney, Agent, or Firm* — Sughrue Mion, PLLC

(57) ABSTRACT

A compound of formula $Li_{a+y}(M^1_{(1-t)}Mo_t)_2M^2_b(O_{1-x}F_{2x})_c$ wherein:
$M^1$ is selected from the group consisting in Ni, Mn, Co, Fe, V or a mixture thereof;
$M^2$ is selected from the group consisting in B, Al, Si, P, Ti, Mo;
with
$4 \leq a \leq 6$;
$0 < b \leq 1.8$;
$3.8 \leq c \leq 14$;
$0 \leq x < 1$;
$-0.5 \leq y \leq 0.5$;
$0 \leq t \leq 0.9$;
$b/a < 0.45$;
the coefficient c satisfying one of the following relationships:
$c=4+y/2+z+2t+1.5b$ if $M^2$ is selected from B and Al;
$c=4+y/2+z+2t+2b$ if $M^2$ is selected from Si, Ti and Mo;
$c=4+y/2+z+2t+2.5b$ if $M^2$ is P;
with $z=0$ if $M^1$ is selected from Ni, Mn, Co, Fe and $z=1$ if $M^1$ is V.

20 Claims, 4 Drawing Sheets

(51) Int. Cl.

| | | |
|---|---|---|
| *C01G 45/12* | (2006.01) | |
| *C01G 53/00* | (2006.01) | |
| *H01M 4/131* | (2010.01) | |
| *H01M 4/1315* | (2010.01) | |
| *H01M 4/133* | (2010.01) | |
| *H01M 4/134* | (2010.01) | |
| *H01M 4/1391* | (2010.01) | |
| *H01M 4/13915* | (2010.01) | |
| *H01M 4/485* | (2010.01) | |
| *H01M 4/505* | (2010.01) | |
| *H01M 4/52* | (2010.01) | |
| *H01M 4/525* | (2010.01) | |
| *H01M 4/587* | (2010.01) | |
| *H01M 4/62* | (2006.01) | |
| *H01M 10/0525* | (2010.01) | |
| *H01M 4/02* | (2006.01) | |

(52) U.S. Cl.
CPC ...... *C01P2006/40* (2013.01); *H01M 2004/021* (2013.01); *H01M 2004/028* (2013.01); *Y02E 60/122* (2013.01)

(56) References Cited

U.S. PATENT DOCUMENTS

| | | |
|---|---|---|
| 2003/0082454 A1 | 5/2003 | Armand et al. |
| 2005/0106462 A1* | 5/2005 | Jordy et al. ............ 429/231.1 |
| 2010/0270497 A1* | 10/2010 | Hezeque et al. ........... 252/182.1 |
| 2011/0017946 A1 | 1/2011 | Choi |

* cited by examiner

POSITIVE ELECTRODE MATERIAL FOR A LITHIUM-ION ACCUMULATOR

TECHNICAL FIELD

The technical field of the invention is that of electrochemically active materials intended to be used in the positive electrode (or cathode) of a rechargeable electrochemical generator (or accumulator) of the lithium-ion type.

STATE OF THE ART

Lithiated oxides of transition metals are known as an electrochemically active material (or active material) which may be used in the positive electrode of rechargeable lithium electrochemical generators. A lithiated oxide of transition metals of general formula $Li_xMO_2$, wherein M represents at least one transition metal, such as Mn, Ni, Co, Al or a mixture thereof is most often used as an active material of the positive electrode in the discharged state. In such an oxide, M is in the degree of oxidation +3 and the lithium content represented by the coefficient x is comprised between 1 and 1.3 lithium atom per metal atom M. When this oxide is subject to a high potential during the charging of the generator, the compound $MO_2$ is formed by de-insertion of the lithium from the structure of the oxide. M is then found with the degree of oxidation +4. Such an oxide therefore can only exchange one electron per metal atom M. Consequently, the maximum theoretical capacity of this type of oxide is of the order of 270 mAh/g.

Present positive electrode materials limit the gain which may be provided by the use of novel negative electrodes based on silicon with a much higher capacity than standard negative electrodes in graphite. Indeed, the mass or the volume of these novel negative active materials are low as compared with those of the positive electrodes. If a negative electrode with optimized capacity is used, FIG. 1 shows that any improvement in the capacity of the positive electrode is expressed by a clear increase in the capacity of the generator.

In order to increase the theoretical capacity of the positive active material, compounds based on transition metals with an oxidation degree of +2 and containing two lithium atoms per metal atom were studied, such as $Li_2NiO_2$. The theoretical capacity of this type of compound is about 510 mAh/g. Nevertheless, their initial irreversible capacity is high and the operating voltage corresponding to the $Ni^{+2}/Ni^{+3}$ pair is less than 2V, which is low.

Silicates and titanates of composition $Li_2MSiO_4$ and $Li_2MTiO_4$ (with M=Fe, Mn) have been contemplated in order to associate high capacity and voltage by means of the effect provided by silicon oxide or titanium oxide. Nevertheless, although the theoretical mass capacity of these materials is improved (330 mAh/g), their theoretical volume capacity remains comparable to that of a lamellar compound only exchanging a single electron per metal atom.

Document KR 2009-0126962 describes a positive active material for an electrochemical generator with lithium, comprising a compound based on manganese represented by the formula $Li_aMn_{(1-b)}M_bO_{(2-c)}D_c$ and by the formula $Li_aMn_{(2-b')}M_bO_{(4-c)}D_c$ with $0.90 \leq a \leq 1.1$; $0 \leq b \leq 0.5$; $0 \leq b' \leq 0.5$; $0 \leq c \leq 0.05$; M being selected from the group consisting of Al, Ni, Co, Mn, Cr, Fe, Mg, Sr, rare earths and mixtures thereof. This document describes a compound of composition $Li_{1.05}Mn_{1.85}Al_{0.1}O_4$. By establishing the electroneutrality relationship of the compound and being aware that the aluminum used is in the degree of oxidation of +3, it is inferred that the manganese is in the average degree of oxidation of +3.6. The manganese may oxidize up to the degree of oxidation of +4, which corresponds to an exchange of 0.4 electron per manganese atom. This is insufficient for obtaining a compound having high electrochemical capacity.

Document JP 2009-274940 describes a lithiated oxide based on manganese of formula $Li_{1+x}(Mn_{(1-m-n)}Fe_mTi_n)_{(1-x)}O_2$ wherein $0<x<\frac{1}{3}$; $0 \leq m \leq 0.60$; $0 \leq n \leq 0.80$ and $0<m+n \leq 0.80$. The compound of Example 4 of this document has the formula $Li_{1.29}(Mn_{0.9}Ti_{0.1})_{0.71}O_2$ i.e. $Li_{1.29}Mn_{0.639}Ti_{0.071}O_2$. This formula may further be written as $Li_{4.04}Mn_2Ti_{0.22}O_{6.26}$ by setting to 2 the stoichiometric coefficient of the electrochemically active element, i.e. manganese. By establishing the electroneutrality relationship of the compound, it is inferred therefrom that the manganese is in the oxidation degree of +3.8. This material can only exchange 0.2 electron per manganese atom, which is insufficient for obtaining a compound having high electrochemical capacity.

Document JP 2009-295290 describes a lithiated oxide based on niobium of formula $Li_xNb_{(1-y)}M_yO_2$ wherein $1 \leq x \leq 2$ and $0 \leq y \leq 0.5$; M being at least one element selected from the group consisting in V, Cr, Mn, Fe, Co, Ni, Mo and W. The compound of Example 6 of this document has the formula $LiNb_{0.75}Mn_{0.25}O_2$. By applying the electro neutrality relationship, it is determined that the overall oxidation degree of the set formed by niobium and manganese is +3. Being aware that the maximum average degree of oxidation which may be attained by the set formed by niobium and manganese is +4.5, it is inferred therefrom that this compound may exchange 1.5 electron per atom of electrochemically active element. However, it can only exchange a single lithium atom; therefore, this compound will only be able to exchange a single electron, which is insufficient for obtaining a compound having high electrochemical capacity.

Document US 2003/0073003 describes a lithiated oxide based on molybdenum of formula $Li_xMoO_2$ with x comprised between 0.1 and 2. According to the electroneutrality relationship it is calculated that the molybdenum is with the degree of oxidation of 4−x. On the other hand, this material does not contain a sufficient amount of lithium relatively to the amount of exchangeable electrons by molybdenum. Indeed, for x=1, the oxide is written as $LiMoO_2$. In this oxide, Mo has the degree of oxidation of +3. It may therefore exchange 3 moles of electrons. Now, the stoichiometry of lithium is of one lithium atom per molybdenum atom. The amount of lithium is therefore insufficient. For x=2 for example, the oxide is written as $Li_2MoO_2$. In this oxide, Mo is with an oxidation degree of +2. It may therefore exchange 4 moles of electrons per mole of Mo. Now, the stoichiometry of lithium is of 2 atoms of lithium for one molybdenum atom. The number of lithium atoms is therefore insufficient relatively to the number of exchangeable electrons by Mo. This oxide therefore does not have optimum capacity. Moreover, its operating voltage is less than 2.5 V. These materials are used with negative active materials which are discharged upon mounting the accumulator. This document also describes a compound of formula $Li_4Mo_3O_8$, i.e. $Li_{4/3}MoO_{8/3}$, wherein molybdenum is with the oxidation degree of +4. A molybdenum atom may therefore exchange 2 electrons. Now, the compound only contains 4/3 lithium atoms per molybdenum atom, which is insufficient for obtaining high electrochemical capacity.

Therefore an electrochemically active material is sought for a positive electrode of a lithium-ion accumulator having a reversible capacity during discharge at least equal to 160 mAh/g, preferably at least equal to 200 mAh/g, still preferably at least equal to 250 mAh/g for discharge at room temperature carried out with a rate of C/20 wherein C designates the current corresponding to a discharge of the electrode carried out in one hour. Preferably, an electrochemical active material is sought having an average operating voltage of at least 2.5V.

SUMMARY OF THE INVENTION

The invention proposes a compound which may be used as an electrochemically active material of a positive electrode of an accumulator of the lithium-ion type. This compound has a reversible mass capacity during discharge at least equal to 160 mAh/g, preferably at least equal to 200 mAh/g, still preferably at least equal to 260 mAh/g. This compound has the formula $Li_{a+y}(M^1_{(1-t)}Mo_t)_2M^2_b(O_{1-x}F_{2x})_c$
wherein:
  $M^1$ is selected from the group consisting in Ni, Mn, Co, Fe, V or a mixture thereof;
  $M^2$ is selected from the group consisting in B, Al, Si, P, Ti, Mo; with
  $4 \leq a \leq 6$;
  $0 < b \leq 1.8$;
  $3.8 \leq c \leq 14$;
  $0 \leq x < 1$;
  $-0.5 \leq y \leq 0.5$;
  $0 \leq t \leq 0.9$;
  $b/a < 0.45$;
  the coefficient c satisfying one of the following relationships:
  $c=4+y/2+z+2t+1.5b$ if $M^2$ is selected from B and Al;
  $c=4+y/2+z+2t+2b$ if $M^2$ is selected from Si, Ti et Mo;
  $c=4+y/2+z+2t+2.5b$ if $M^2$ is P;
  with $z=0$ if $M^1$ is selected from Ni, Mn, Co, Fe and $z=1$ if $M^1$ is V.

According to an embodiment, $M^1$ is selected from the group consisting in Mn, Co, Fe and V.

According to an embodiment, $0 \leq t \leq 0.5$.

According to an embodiment, $M^2$ is selected from the group consisting in B, Ti and Si.

According to an embodiment, the ratio b/a is less than or equal to 0.25.

According to an embodiment, $M^1$ is Mn and $M^2$ is Ti.

According to an embodiment, $M^1$ is Mn and $M^2$ is Si.

According to an embodiment, the compound only comprises a single crystalline phase.

According to an embodiment, the compound comprises several crystalline phases.

According to an embodiment, the compound comprises at least one crystalline phase in which the interplanar spacing $d_{hkl}$ is greater than 0.015 Å, preferably greater than 0.03 Å.

The object of the invention is also a composite material comprising the compound according to the invention and carbon in a mass percent of less than 20% by weight based on the weight of the composite material, preferably between 1 and 10%, still preferably, about 5%.

The object of the invention is also an electrode comprising the compound or the composite material.

The object of the invention is also an accumulator of the lithium-ion type comprising a positive electrode comprising the compound or the composite material.

According to an embodiment, the accumulator comprises a negative electrode comprising an active material capable of inserting lithium into its structure.

According to an embodiment, the active material of the negative electrode is selected from the group consisting in carbon, tin, silicon, compounds based on carbon and silicon, compounds based on carbon and tin, compounds based on carbon, tin and silicon.

The object of the invention is also a method for making the compound according to the invention comprising the steps:
  a) forming the compound by mechanosynthesis;
  b) annealing the compound at a temperature below 700° C.

The object of the invention is also a method for making the composite material according to the invention comprising the steps:
  a) forming the compound by mechanosynthesis;
  b) adding carbon to the compound;
  c) milling the mixture comprising the carbon and the compound in order to form the composite material;
  d) optionally annealing of the composite material at a temperature of less than or equal to 700° C.

According to an embodiment, the annealing is carried out at a temperature comprised between 350 and 450° C., preferably at a temperature of about 400° C.

SHORT DESCRIPTION OF THE FIGURES

Figure 3:
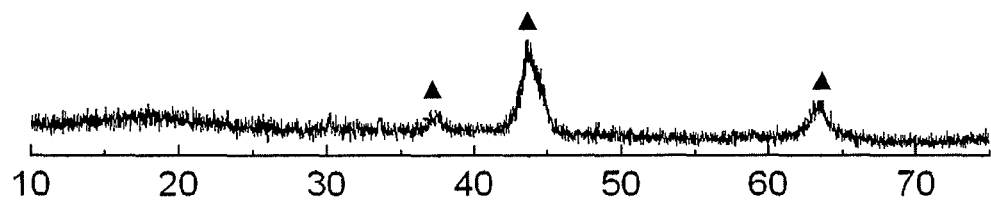
Figure 4:
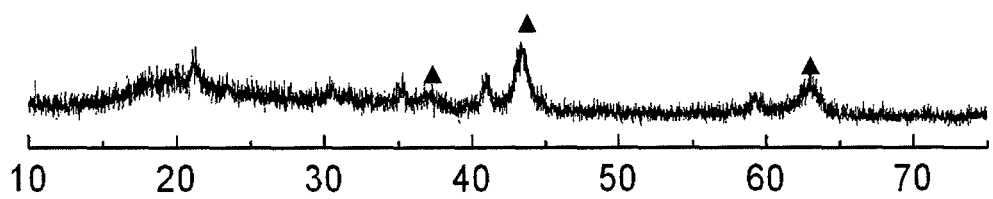

FIGS. 3 and 4 respectively illustrate the X-ray diffraction spectra of the compounds of Examples 6 and 4.

DESCRIPTION OF THE EMBODIMENTS OF THE INVENTION

The invention consists of making a compound containing:
  at least one electrochemically active element capable of exchanging at least 2 electrons and
  lithium for which the stoichiometric coefficient in the compound is close to the number of exchangeable electrons.
This compound has the formula $Li_{a+y}(M^1_{(1-t)}Mo_t)_2 M^2_b(O_{1-x}F_{2x})_c$ wherein:
$M^1$ is selected from the group consisting in Ni, Mn, Co, Fe, V or a mixture thereof;
$M^2$ is selected from the group consisting in B, Al, Si, P, Ti, Mo;
with
$4 \leq a \leq 6$;
$0 < b \leq 1.8$;
$3.8 \leq c \leq 14$;
$0 \leq x < 1$;
$-0.5 \leq y \leq 0.5$;
$0 \leq t \leq 0.9$;

By number of exchangeable electrons is meant the theoretical number of electrons which an electrochemically active element may lose (respectively gain) during charging (respectively discharging) of an electrode containing the compound according to the invention. The number of exchangeable electrons per electrochemically active element is equal to the difference between the degree of oxidation of the electrochemically active element in the relevant compound during the mounting of the accumulator, and the oxidation degree of the electrochemically active element when the electrode is in the charged state.

According to the invention, the electrochemically active element, symbolized by $M^1$, is selected from the group consisting in Ni, Mn, Co, Fe, V or a mixture thereof. $M^1$ is optionally partly substituted with molybdenum. The elements Ni, Mn, Co, Fe exist with an oxidation degree of +2. They are oxidized to the oxidation degree +4 when they are subject to a sufficiently high potential during the charging of the positive electrode. They are therefore capable of exchanging at least two electrons. For example, the compounds MnO, NiO, CoO, FeO, their hydroxides or their associated fluorides may be used.

$M^1$ may be vanadium with an oxidation degree of +2 or +3. The vanadium is oxidized to the oxidation degree +5 during the charging of the electrode. The vanadium may therefore exchange two or three electrons depending on its initial oxidation degree. The compounds VO, $VF_2$ with an oxidation degree +2 and $V_2O_3$, $VF_3$ with an oxidation degree +3 may for example be used.

According to the invention, the amount of lithium in the compound is close to the number of electrons exchangeable by the electrochemically active element(s). The term of "close" means that the absolute value of the difference between the coefficient "a" and the sum of the electrons exchanged by $M^1$ and possibly Mo, is less than 0.5. In other words, to within the value of the coefficient "y", the coefficient "a" associated with lithium is equal to the sum of the numbers of electrons exchanged by $M^1$ and possibly by Mo.

$M^2$ is selected from the group consisting in B, Al, Si, P, Ti and Mo. The presence of $M^2$ for example allows an increase in the operating voltage of the compound. $M^2$ may be incorporated to the compound via a precursor such as $B_2O_3$, $Al_2O_3$, $SiO_2$, $P_2O_5$, $(NH_4)_2HPO_4$, $TiO_2$, $MoO_2$. It is also possible to use molybdenum with a degree of oxidation of +3 or +4. The molybdenum with oxidation degree +3 is obtained by mixing molybdenum metal $Mo^o$ with molybdenum oxide $MoO_2$ in a $MoO_2/Mo^o$ ratio equal to 3. The molybdenum with oxidation degree +4 is found in the form of pure $MoO_2$. Molybdenum switches to the oxidation degree +6 during the charging of the electrode. It therefore exchanges 2 or 3 electrons depending on its initial oxidation degree. According to the invention b/a is less than 0.45 so as not to reduce the mass and volume capacity of the compound. In a preferred embodiment, b/a is less than or equal to 0.25.

The stoichiometric coefficient c of the oxygen may be expressed as a function of the stoichiometric coefficients of the other chemical elements of the compound by writing that the electroneutrality relationship of the compound is satisfied on the one hand (relationship (I)) and that the number of electrons exchangeable by $M^1$ and possibly Mo is equal to the coefficient a on the other hand (relationship (III)).

Electroneutrality Relationship Applied to the Compound:

The value of the coefficient c is calculated so as to observe the electroneutrality relationship of the compound which is written as $$a+y+2[(1-t)d^{M1}+t\times d^{Mo}]+b\times d^{M2}=2\times c \quad (I)$$

wherein $d^{M1}$ designates the degree of oxidation of $M^1$ when the electrode is in the discharged state;

$d^{M2}$ designated the degree of oxidation of $M^2$ when the electrode is in the discharged state;

$d^{Mo}$ designates the degree of oxidation of molybdenum, which may be equal to 3 or 4 for a discharged state of the electrode.

$d^{Mo}$ may be written as:

$$d^{Mo}=4-k \quad (II)$$

with k=0 if the molybdenum is with a degree of oxidation of +4 and k=1 if the molybdenum is with a degree of oxidation of +3.

Determination of the degree of oxidation may be accomplished by oxidation-reduction titration via the iodometric technique.

The value of the coefficient a may be expressed as a function of the coefficients k and t.

Expression of the Value of the Coefficient a:

For x=0 and y=0, the formula of the compound is written as $Li_a(M^1_{(1-t)}Mo_t)_2M^2_bO_c$. The sum of the number of electrons which may be exchanged by $M^1$ and Mo is then calculated, which for y=0 is equal to the coefficient a.

If $M^1$ is selected from Mn, Co, Fe, or Ni, it is found in the oxidation state +2 when the electrode is in the discharged state and is oxidized to the oxidation state +4 when the electrode is in the charged state. The number of electrons which an $M^1$ atom may exchange is therefore 2. Now, the stoichiometric index of $M^1$ is 2×(1−t). $M^1$ may therefore exchange 2×2×(1−t) electrons.

The number of electrons which molybdenum may exchange depends on its degree of oxidation. Indeed, when the electrode is in the discharged state, the oxidation degree of molybdenum is either +3, or +4. When a molybdenum atom is oxidized from the oxidation degree of +3 to the oxydation degree of +6, it exchanges 3 electrons. When a molybdenum atoms switches from the oxidation degree of +4 to the oxidation degree of +6, it exchanges 2 electrons. The number of electrons exchanged by molybdenum may be expressed as a function of the degree of oxidation of the molybdenum. It is equal to 2+k and therefore has the value 2 if the molybdenum atom is with an oxidation degree of +4 ($d^{Mo}$=4−k with k=0). Therefore it has the value 3 if the molybdenum atom is with the oxidation degree of +3 ($d^{Mo}$=4−k with k=1). The molybdenum in the compound may therefore exchange 2t(2+k) electrons.

The coefficient a therefore has the value: $a=2\times 2(1-t)+2t(2+k)=4+2kt$ (III)

By substituting in the relationship (I), the coefficient a with its expression given by the relationship (III), one obtains:

$$4+2kt+y+2[(1-t)d^{M1}+t\times d^{Mo}]+b\times d^{M2}=2c$$

Under the assumption that $M^1$ is selected from Mn, Co, Fe, or Ni, it is found in the oxidation state of +2 for an electrode in the discharged state. Whence:

$$4+2kt+y+2[(1-t)\times 2+t\times(4-k)]+b\times d^{M2}=2c; \text{ i.e.}$$

$$4+2kt+y+4-4t+8t-2kt+b\times d^{M2}=2c; \text{ i.e.}$$

$$c=4+y/2+2t+(b/2)\times d^{M2}$$

$M^2$ being selected from B, Al, Si, P, Ti, Mo, its oxidation degree can only assume the values 3, 4 or 5, whence:

$$c=4+y/2+2t+1.5b \text{ if } M^2 \text{ is selected from B and Al;}$$

$$c=4+y/2+2t+2b \text{ if } M^2 \text{ is selected from Si, Ti and Mo;}$$

$$c=4+y/2+2t+2.5b \text{ if } M^2 \text{ is P}$$

If $M^1$ is V with the oxidation degree of +2, t=0 and x=0, the formula of the compound is written as $Li_{6+y}V_2M^2_bO_c$. Indeed, the value a=6 for lithium corresponds to the fact that vanadium with the oxidation degree of +2 looses 3 electrons so as to switch to the oxidation degree of +5. The compound contains two vanadium atoms which corresponds to 2×3=6 exchangeable electrons. Now, according to the invention, the stoichiometric coefficient of lithium is equal, to within the value of y, to the number of electrons exchanged by the electrochemically active element, i.e. 6 in this case. The value c is inferred from the electroneutrality relationship which is written as:

$$6+y+2\times2+b\times d^{M2}=2c;$$

whence $c=5+y/2+(b/2)\times d^{M2}$

If $M^1$ is V with an oxidation degree of +3, t=0 et x=0, the formula of the compound is written as $Li_{4+y}V_2M^2_bO_c$. Indeed, the value a=4 for lithium corresponds to the fact that the vanadium with a degree of oxidation of +3 loses 2 electrons in order to switch to the degree of oxidation of +5. The compound contains two vanadium atoms, which corresponds to 2×2=4 exchangeable electrons. Now according to the invention, the stoichiometric coefficient of lithium is equal, to within the value of y, to the number of electrons exchanged by the electrochemically active element, i.e. 4 in this case. The value of c is inferred from the electroneutrality relationship which is written as:

$$4+y+3\times2+b\times d^{M2}=2c$$

whence $c=5+y/2+(b/2)\times d^{M2}$

It may be noted that in the case when $M^1$ is V, the expression of c is independent of the degree of oxidation of the vanadium.

The stoichiometric coefficient c of the compound according to the invention then verifies the relationship: $c=4+z+y/2+2t+(b/2)\times d^{M2}$ with:
z=0 if $M^1$ is selected from Ni, Mn, Co, Fe and
z=1 if $M^1$ is V.

The compound may be synthesized by mechanosynthesis by mixing under an inert atmosphere the precursors in the desired stoichiometric amounts, and then by milling the mixture for example with a ball mill. By mechanosynthesis is meant the whole of the techniques for making molecular structures in which the encounter of the atoms, which is at the origin of the chemical reactions required for the synthesis process, is determined by mechanical means. It is also possible to contemplate the synthesis of the compound by sol-gel techniques by adapting the precursors.

The composition of the synthesized compound may be determined by scanning electron microscopy (SEM) coupled with energy dispersion X ray spectroscopy (EDS), by X ray fluorescence and by X ray diffraction analysis (XRD). X ray diffraction analysis gives the possibility of determining whether the compound comprises a single crystalline phase (monophasic material) or several crystalline phases (multiphase material).

Preferably the compound comprises at least one crystalline phase in which the interplanar spacing $d_{hkl}$ is greater than 0.015 Å, preferably greater than 0.03 Å. The interplanar spacing $d_{hkl}$ is defined as being the shortest distance between two planes of atoms of the {hkl} family. The interplanar spacing $d_{hkl}$ is inferred from the measurement of the theta diffraction angle of the X ray diffraction spectrum by using Bragg's law:

$$lambda=2\times d\times sin(theta)$$

wherein lambda is the wavelength of the source used. In the examples hereafter, this is the K alpha line of copper=1.5418 Å.

Preferably, carbon for example as active carbon is added to the obtained compound. The mixture is then milled in order to obtain a composite material, i.e. an assembly of carbon and of the compound according to the invention having a strong adhesion capability between them. The carbon percentage is generally less than 20% by weight based on the weight of the composite material.

Preferably, the composite material is subject to an annealing step under an inert gas at a temperature of less than or equal to 700° C., preferably between 350° C. and 450° C., for example 400° C. In the case when the compound according to the invention is not mixed with carbon, the annealing step is carried out at a temperature of less than 700° C., preferably between 350° C. and 450° C., for example 400° C. With the annealing, it is possible to promote the formation of crystalline phases.

The object of the present invention is also a positive electrode of a rechargeable electrochemical generator with lithium, containing as an electrochemically active material, the compound or the composite material as described earlier. The electrode according to the invention consists of a conducting support being used as a current collector which is coated with a layer containing the electrochemically active material according to the invention and further comprising a binder and a conductive material.

The current collector is preferably a two-dimensional conducting support such as a solid or perforated sheet, based on carbon or metal, for example in nickel, steel, stainless steel or aluminum.

The binder may contain one or more of the following components: polyvinylidene fluoride (PVdF) and its copolymers, polytetrafluoroethylene (PTFE), polyacrylonitrile (PAN), polymethyl or polybutyl methacrylate, polyvinyl chloride (PVC), polyvinylformal, polyesters and amide block polyethers, polymers of acrylic acid, methylacrylic acid, acrylamide, itaconic acid, sulfonic acid, elastomers and cellulose compounds.

Among the elastomers which may be used, mention may be made of ethylene/propylene/diene terpolymers (EPDM), styrene/butadiene copolymers (SBR), acrylonitrile/butadiene copolymers (NBR), styrene/butadiene/styrene block copolymers (SBS) or styrene/acrylonitrile/styrene block copolymers (SIS), styrene/ethyl ene/butylene/styrene copolymers (SEBS), styrene/butadiene/vinylpyridine terpolymers (SBVR), polyurethanes (PU), neoprenes, polyisobutylenes (PIB), butyl rubbers and mixtures thereof.

The cellulose compound may be a carboxymethylcellulose (CMC), a hydroxypropylmethylcellulose (HPMC), a hydroxypropylcellulose (HPC) or a hydroxyethylcellulose (HEC).

The conductive material is selected from graphite, carbon black, acetylene black (AB), soot or one of their mixtures.

The object of the present invention is further an electrochemical generator with lithium, comprising a positive electrode containing the compound or the composite material as described earlier. The generator according to the invention further comprises at least one negative electrode, at least one separator and one electrolyte.

The negative electrode consists of a conducting support used as a current collector which is coated with a layer containing the electrochemically active material and further comprising a binder and a conductive material. The electrochemically active material may be selected from lithium compounds, a carbonaceous material capable of inserting lithium in its structure such as graphite, coke, carbon black and glassy carbon, and a mixed oxide of lithium and of a transition metal such as nickel, cobalt or titanium. It may also contain tin, silicon, compounds based on carbon and silicon, compounds based on carbon and on tin and compounds based on carbon, tin and silicon. It may comprise silicon, the surface of which is grafted with an organic group as described in document EP-A-2 242 129. It may comprise a nanocomposite Si—C material as described in document FR-A-2 885 734. The anodes used may also consist of oxides, nitrides or phosphides of transition metals.

The electrolyte is selected from a non-aqueous liquid electrolyte including a lithium salt dissolved in a solvent and a solid polymer electrolyte conducting lithium ions, such as for example polyethylene oxide (PEO).

The lithium salt is selected from lithium perchlorate $LiClO_4$, lithium hexafluoroarsenate $LiAsF_6$, lithium hexafluorophosphate $LiPF_6$, lithium tetrafluoroborate $LiBF_4$, lithium trifluoromethanesulfonate $LiCF_3SO_3$, lithium trifluoromethanesulfonimide $LiN(CF_3SO_2)_2$ (LiTFSI), lithium trifluoromethanesulfonemethide $LiC(CF_3SO_2)_3$ (LiTFSM), lithium bisperfluoroethylsulfonimide $LiN(C_2F_5SO_2)_2$ (BETI) and mixtures of the previous compounds.

Preferably, the solvent is a solvent or a mixture of solvents selected from usual organic solvents, notably saturated cyclic carbonates, unsaturated cyclic carbonates, non-cyclic carbonates, alkyl esters such as formates, acetates, propionates or butyrates, ethers, lactones such as gamma-butyrolactone, tetrahydrothiophene bioxide, nitrile solvents and mixtures thereof. Among such saturated cyclic carbonates, mention may be made for example of ethylene carbonate (EC), propylene carbonate (PC), butylene carbonate (BC), and mixtures thereof. Among unsaturated cyclic carbonates, mention may for example be made of vinylene carbonate (VC), its derivatives and mixtures thereof. Among non-cyclic carbonates, mention may for example be made of dimethyl carbonate (DMC), diethyl carbonate (DEC), ethyl methyl carbonate (EMC), dipropyl carbonate (DPC) and mixtures thereof. Among the alkyl esters, mention may for example be made of methyl acetate, ethyl acetate, methyl propionate, ethyl propionate, butyl propionate, methyl butyrate, ethyl butyrate, propyl butyrate and mixtures thereof. Among the ethers, mention may for example be made of dimethyl ether (DME) or diethyl ether (DEE), and mixtures thereof.

The separator may consist of polypropylene (PP), polyethylene (PE), polytetrafluoroethylene (PTFE), polyacrylonitrile (PAN), polyethylene terephthalate (PET).

Examples 1 to 7

Preparation of the Samples

The compounds were synthesized from the following precursors, MnO, $SiO_2$, $Li_2O$, $(NH_4)_2HPO_4$, $TiO_2$, $MoO_2$, $Mo^o$ and VO.

The synthesis was carried out via a mechanical route with a planetary mill of the Ago 2 type. The different precursors were introduced in stoichiometric amounts into a stainless steel jar in a glove box under argon. 200 grams of stainless steel balls were added to the 5 grams of mixture. The precursors used for the compounds containing molybdenum and for which k=1 are $Mo^o$ and $MoO_2$ with a $MoO_2/Mo^o=3$ molar ratio so that the average degree of oxidation of the molybdenum is equal to 3; for k=0, pure $MoO_2$ was used. The verification of the degree of oxidation may be accomplished by oxidation-reduction titration by the iodometry technique. The mechanosynthesis was carried out at a speed of rotation of 900 revolutions/min (rpm) for 30 mins. After mechanical treatment, the jar is opened in the glove box under argon and 5% by weight of active coal (Mellinckrodt Baker, Inc.) are added. A second milling is then carried out at 900 rpm for 5 min. The obtained mixture is then heat treated at 400° C. with circulation of argon for 4 hours.

X ray diffraction analyses were carried out with a Bruker D8 Advance diffractometer by using the Cu Kα line. As an example, FIGS. 3 and 4 respectively relating to Examples 6 and 4 show that the material may be quasi monophasic (the lines of the diffractogram of FIG. 3 corresponding to Example 6 are indexed in a cubic structure) or polyphasic (no structure allowing the set of lines of the diffractogram of FIG. 4 to be indexed, corresponding to Example 4, was able to be identified).

Table 1 below indicates the formulae of the tested compounds. Preparation of compounds of formulae $Li_{4.1}(Mn_{0.95}Mo_{0.05})_2SiO_{6.15}$, $Li_4Mn_2Ti_{0.05}O_{2.1}F_4$ and $Li_4Mn_2P_{1.33}O_{7.33}$ may also be contemplated. Each of the compounds of Examples 2-7 comprises an electrochemically active element, optionally substituted with molybdenum, which may exchange at least two electrons per electrochemically active metal atom. With Table 1, it may be checked that the formula of each of the compounds of Examples 2-7 satisfies the relationship:

$c=4+y/2+z+2t+2b$ if $M^2$ is selected from Si and Ti;

$c=4+y/2+z+2t+2.5b$ if $M^2$ is P;

with z=0 if $M^1$ is Mn, and z=1 if $M^1$ is V.

Figure 1:
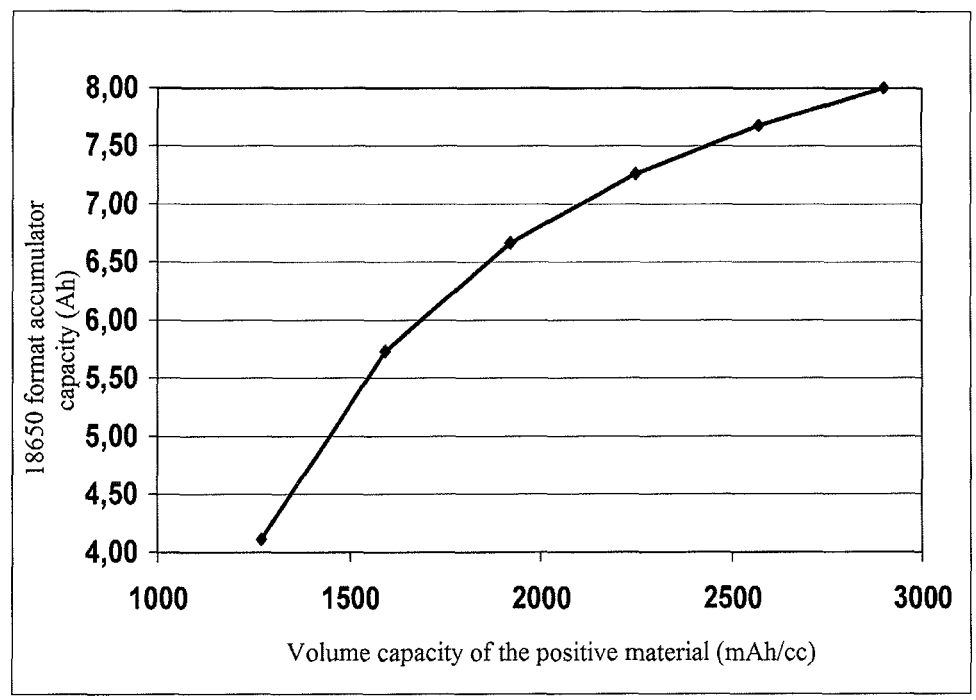
FIG. 1 illustrates the time-dependent change in the capacity of an accumulator of the 18650 type versus the volume capacity of the electrochemically active material of the positive electrode. The electrochemically active material of the negative electrode is based on silicon.
Figure 2:
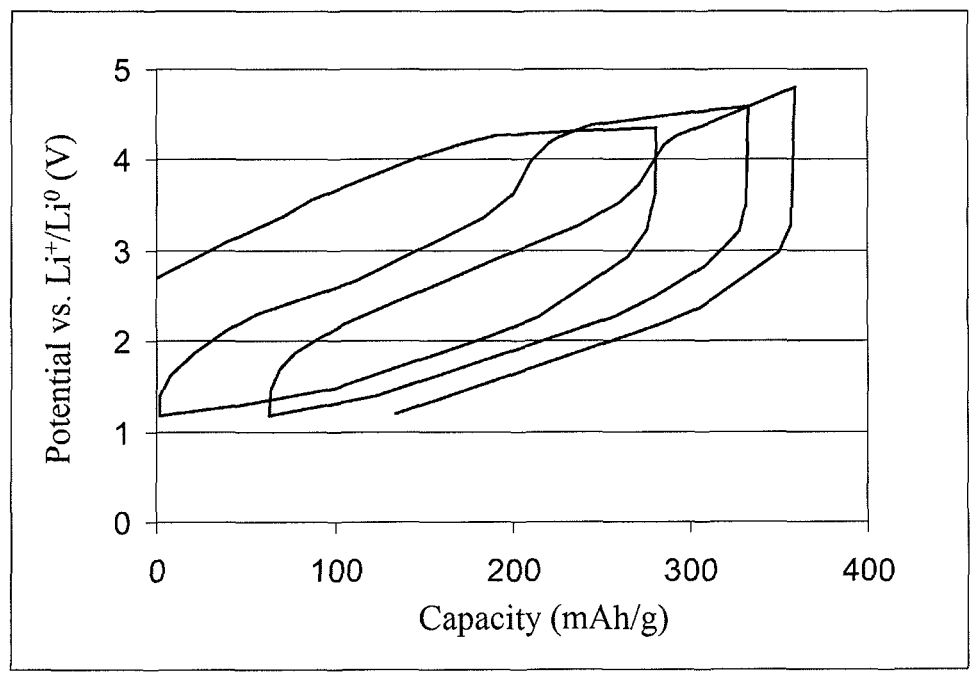
FIG. 2 illustrates the charging-discharging curves of the compound of Example 3 after having mixed the latter with 5% by weight of carbon and having treated it at 400° C. 1st charging: cut-off voltage Uc=4.4V; $2^{nd}$ charging Uc=4.6V; $3^{rd}$ charging Uc=4.8V.

For preparing the electrodes, 28% of carbon black (Super P from Timcal) were mixed with the compound of the invention. The thereby obtained mixture was then tested in a cell of the Swagelok type by using lithium metal as a counter-electrode. The electrolyte consists of an ethyl carbonate/dimethyl carbonate (EC:DMC) mixture and of the salt $LiPF_6$ with a concentration of 1M. The cycles were carried out between 1.2V and 4.8V at a rate of C/20. The charging-discharging curves of the compound of Example 3 are illustrated in FIG. 2. These curves give the possibility of determining for each tested exemplary compound, its reversible capacity upon discharging. The capacity values were copied into Table 2.

TABLE 1 composition of the tested compounds; values of the parameters characterizing the stoichiometry of compositions of the $Li_{a+y}(M^1_{(1-t)}Mo_t)_2M^2_b(O_{1-x}F_{2x})_c$ type.

| # | Formula of the compound | $M^1$ | $M^2$ | a | b | c | x | y | z | t | k | b/a |
|---|---|---|---|---|---|---|---|---|---|---|---|---|
| 1 | $Li_4Mn_2Si_2O_8 = Li_2MnSiO_4$ (prior art) | Mn | Si | 4 | 2 | 8 | 0 | 0 | 0 | 0 | — | 0.5 |
| 2 | $Li_4Mn_2TiO_6$ | Mn | Ti | 4 | 1 | 6 | 0 | 0 | 0 | 0 | — | 0.2500 |
| 3 | $Li_{5.9}(Mn_{0.1}Mo_{0.9})_2Ti_{0.05}O_{5.95}$ | Mn | Ti | 5.8 | 0.05 | 5.95 | 0 | 0.1 | 0 | 0.9 | 1 | 0.0086 |
| 4 | $Li_{4.1}(Mn_{0.5}Mo_{0.5})_2Ti_{0.05}O_{5.15}$ | Mn | Ti | 4 | 0.05 | 5.15 | 0 | 0.1 | 0 | 0.5 | 0 | 0.0125 |
| 5 | $Li_{5.8}(Mn_{0.1}Mo_{0.9})_2SiO_{7.8}$ | Mn | Si | 5.8 | 1 | 7.8 | 0 | 0 | 0 | 0.9 | 1 | 0.1724 |
| 6 | $Li_{5.8}(Mn_{0.1}Mo_{0.9})_2TiO_{7.8}$ | Mn | Ti | 5.8 | 1 | 7.8 | 0 | 0 | 0 | 0.9 | 1 | 0.1724 |
| 7 | $Li_6V_2P_{1.8}O_{10}$ | V | P | 6 | 1.8 | 8.6 | 0 | 0 | 1 | 0 | — | 0.3000 |

TABLE 2 theoretical and experimental mass and volume capacities of the compounds being part of the invention
(#2 to 7) as compared with the relative values of the compound being part of the prior art (#1)

| # | Formula of the compound | Ctheoretical (mAh/g) | Ctheoretical (mAh/cc) | Ccharged (mAh/g) | Ccharged (mAh/cc) * | Cdischarged (mAh/g) | Average discharge voltage (V) |
|---|---|---|---|---|---|---|---|
| 1 | $Li_4Mn_2Si_2O_8 = Li_2MnSiO_4$ (prior art) | 333 | 1240 | 270 | 1005 | 80 | 3 V |
| 2 | $Li_4Mn_2TiO_6$ | 381 | 1594 | 321 | 1343 | 180 | 2.8 V |
| 3 | $Li_{5.9}(Mn_{0.1}Mo_{0.9})_2Ti_{0.05}O_{5.95}$ | 488 | 2323 | 358 | 1704 | 332 | 2.2 V |
| 4 | $Li_{4.1}(Mn_{0.5}Mo_{0.5})_2Ti_{0.05}O_{5.15}$ | 414 | 1921 | 350 | 1624 | 280 | 2.5 V |
| 5 | $Li_{5.8}(Mn_{0.1}Mo_{0.9})_2SiO_{7.8}$ | 413 | 1802 | 240 | 1047 | 200 | 2 V |
| 6 | $Li_{5.8}(Mn_{0.1}Mo_{0.9})_2TiO_{7.8}$ | 393 | 1784 | 320 | 1453 | 240 | 2.3 V |
| 7 | $Li_6V_2P_{1.8}O_{10}$ | 440 | 1507 | 310 | 1062 | 160 | 2.6 V |

* value obtained from an estimated density.

The results of Table 2 show that the compounds of Examples 2-7 according to the invention have a capacity of at least 160 mAh/g, which is twice as great as the capacity of the compound according to Example 1.

Table 2 shows that the discharge voltage is lower when the molybdenum content is high.

Examples 8 to 10

The examples have the purpose of evaluating the effects of the addition of carbon and of recrystallization after mechanosynthesis.

Preparation of the Samples:

The compounds of Examples 8 to 10 have the formula $Li_4Mn_2TiO_6$. They were synthesized from the following precursors MnO, $Li_2O$, $TiO_2$. For Example 10, 5% by weight of active coal (Mellinckrodt Baker, Inc.) are added in order to improve the electric conductivity of the material.

The synthesis was carried out via a mechanical route with a planetary mill of the Ago 2 type. The different precursors were introduced in stoichiometric amounts into a stainless steel jar in a glove box under argon. 200 grams of stainless steel balls were added to the 5 grams of mixture. Mechanosynthesis was carried out at a speed of rotation of 900 rpm for 30 mins. After the mechanical treatment, the jar is opened in the glove box under argon. For Example 10, 5% by weight of active coal (Mellinckrodt Baker, Inc.) are added. A second milling is then carried out at 900 rpm for 5 mins.

The obtained mixture is then heat treated with circulation of argon for 4 hours at 400° C. for Example 8 and at 700° C. for Examples 9 and 10.

For preparing the electrodes, 28% of carbon black (Super P from Timcal) were mixed with the material of the invention. The thereby obtained mixture was then tested in a cell of the Swagelok type by using lithium metal as a counter-electrode. The electrolyte consists of a ethyl carbonate/dimethyl carbonate (EC:DMC) mixture and of a salt $LiPF_6$ with a concentration of 1M. The cycles were carried out between 1.2V and 4.6V at a rate of C/20. The reversible capacity values were copied into Table 3.

TABLE 3 experimental reversible mass capacities of the materials corresponding to Examples #8 to #10.

| # | Carbon percentage | Heat treatment temperature | Half height line width in 2θ (°) | Half height line width in d (Å) (*) | Cdischarged (mAh/g) |
|---|---|---|---|---|---|
| 8 | 0 | 400° C. | 0.7 to 1.2° | 0.030 to 0.055 | 246 |
| 9 | 0 | 700° C. | 0.25° | 0.011 to 0.017 | 81 |
| 10 | 5% | 700° C. | 0.3 to 0.6° | 0.016 to 0.027 | 202 |

(*) the values of d, the interplanar spacing, are estimated from Bragg's law.

Table 3 shows that better results are obtained when the material is less crystalline on the one hand (which is expressed by a greater half height width of the diffraction lines) and when it contains carbon on the other hand.

The invention claimed is:

1. A compound of formula $Li_{a+y}(M^1_{(1-t)}Mo_t)_2M^2_b(O_{1-x}F_{2x})_c$
wherein:
   $M^1$ is selected from the group consisting in Ni, Mn, Co, Fe, V or a mixture thereof;
   $M^2$ is selected from the group consisting in B, Al, Si, P, Ti and Mo;
   with
   $4 \leq a \leq 6$;
   $0 < b \leq 1.8$;
   $3.8 \leq c \leq 14$;
   $0 \leq x < 1$;
   $-0.5 \leq y \leq 0.5$;
   $0 \leq t \leq 0.9$;
   $b/a < 0.45$;
   the coefficient c satisfying one of the following relationships:
   $c = 4 + y/2 + z + 2t + 1.5b$ if $M^2$ is selected from B and Al;
   $c = 4 + y/2 + z + 2t + 2b$ if $M^2$ is selected from Si, Ti and Mo;
   $c = 4 + y/2 + z + 2t + 2.5b$ if $M^2$ is P;
   with $z = 0$ if $M^1$ is selected from Ni, Mn, Co and Fe; and $z = 1$ if $M^1$ is V,
   wherein the compound comprises at least one crystalline phase in which the interplanar spacing $d_{hkl}$ is greater than 0.015 Å.

2. The compound according to claim 1, wherein $M^1$ is selected from the group consisting in Mn, Co, Fe and V.

3. The compound according to claim 1, wherein $0 \leq t \leq 0.5$.

4. The compound according to claim 1, wherein $M^2$ is selected from the group consisting in B, Ti and Si.

5. The compound according to claim 1, wherein b/a is less than or equal to 0.25.

6. The compound according to claim 1, wherein $M^1$ is Mn and $M^2$ is Ti.

7. The compound according to claim 1, wherein $M^1$ is Mn and $M^2$ is Si.

8. The compound according to claim 1, comprising a single crystalline phase.

9. The compound according to claim 1, comprising several crystalline phases.

10. The compound according to claim 1, comprising at least one crystalline phase in which the interplanar spacing $d_{hkl}$ is greater than 0.03 Å.

11. A composite material comprising the compound according to claim 1 and carbon in a mass percentage of less than 20% by weight based on the weight of the composite material.

12. The composite material according to claim 11, wherein the carbon percentage is comprised between 1 and 10%, preferentially about 5%.

13. An electrode comprising the compound according to claim 1.

14. An electrode comprising the composite material according to claim 11.

15. An accumulator of the lithium ion type comprising a positive electrode according to claim 13.

16. The accumulator according to claim 15, comprising a negative electrode comprising an active material capable of inserting lithium into its structure.

17. The accumulator according to claim 16, wherein the active material of the negative electrode is selected from the group consisting in carbon, tin, silicon, compounds based on carbon and silicon, compounds based on carbon and tin, compounds based on carbon, tin and silicon.

18. A method for making the compound according to claim 1 comprising the steps:
   a) forming the compound by mechanosynthesis;
   b) annealing the compound at a temperature below 700° C.

19. A method for making the composite material according to claim 11 comprising the steps:
   a) forming the compound by mechanosynthesis;
   b) adding carbon to the compound;
   c) milling the mixture comprising the carbon and the compound in order to form the composite material;
   d) optionally annealing of the composite material at a temperature less than or equal to 700° C.

20. The making method according to claim 18, wherein annealing is carried out at a temperature comprised between 350 and 450° C., preferably at a temperature of about 400° C.

* * * * *